Feb. 7, 1961 S. F. KUC 2,970,632
VEHICLE WHEEL CHAIN
Filed May 28, 1959
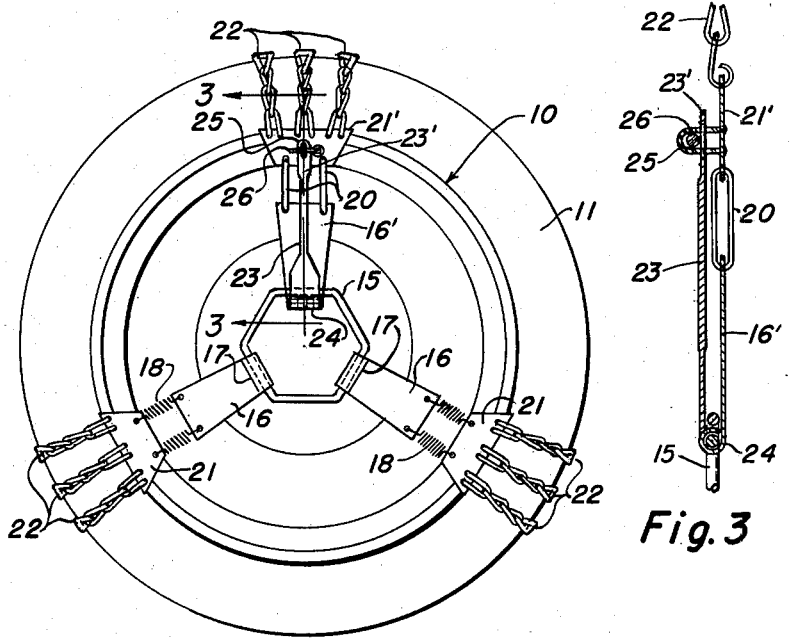
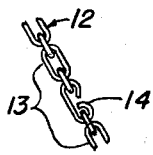
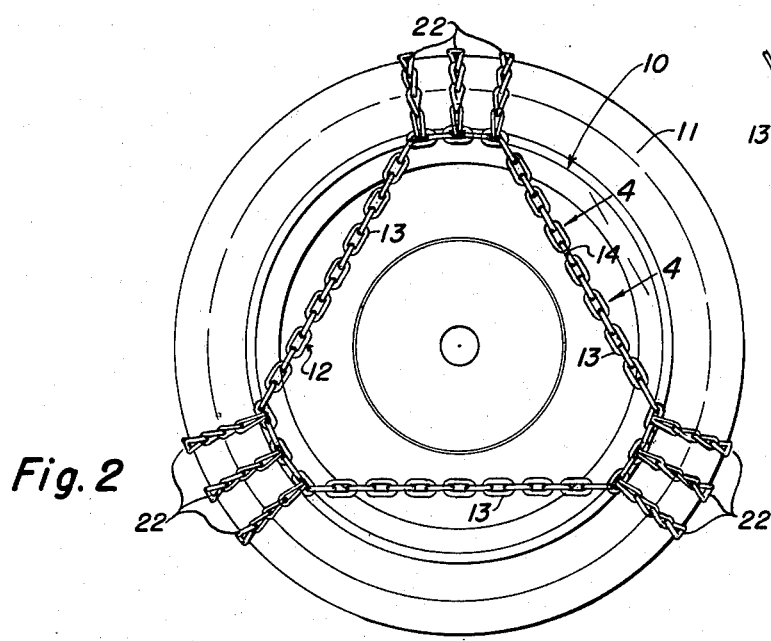
INVENTOR.
Simon F. Kuc.
BY Victor J. Evans & Co.
ATTORNEYS

United States Patent Office 2,970,632
Patented Feb. 7, 1961

2,970,632

VEHICLE WHEEL CHAIN

Simon F. Kuc, South Amboy, N.J.
(2413 W. 4th St., Chester, Pa.)

Filed May 28, 1959, Ser. No. 816,481

3 Claims. (Cl. 152—241)

This invention relates to a unit chain assembly, and more particularly to a unit chain assembly for the wheel of a vehicle such as an automobile, truck, bus or the like.

The object of the invention is to provide a unit chain assembly which is adapted to be used when a vehicle is being operated in adverse weather conditions, as for example when the vehicle is being operated on snow or ice so that increased traction will be provided.

Another object of the invention is to provide a vehicle wheel unit chain assembly which is constructed so that the unit chain assembly can be conveniently removed or placed on the vehicle wheel without the necessity of jacking up the vehicle or removing the wheel.

A further object of the invention is to provide a vehicle wheel unit chain assembly which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view looking at one side of a wheel and showing the unit chain assembly of the present invention thereon.

Figure 2 is a view similar to Figure 1 but looking at the opposite side of the wheel.

Figure 3 is a sectional view taken on the line 3—3 of Figure 1.

Figure 4 is a sectional view taken on the line 4—4 of Figure 2.

Referring in detail to the drawings, the numeral 10 indicates a conventional wheel such as a vehicle wheel which may be used on an automobile, truck, bus or the like, and the wheel 10 is provided with the usual tire 11. According to the present invention there is provided a unit anti-skid device for use on the wheel when the vehicle is being operated in snow, ice, or the like, whereby increased traction will be provided, and the unit anti-skid device of the present invention includes a chain which is indicated generally by the numeral 12, and the chain 12 is adapted to be arranged contiguous to the inside or inner surface of the wheel 10 and tire 11. The chain 12 is of the type which includes a plurality of chain links 13 that are connected together, and a hook member 14 serves to detachably connect certain of the chain links 13 together, Figures 2 and 4.

Arranged adjacent the outside of the wheel 10 is a bracket 15 which is shown to have a hexagonal shape, Figure 1, and the numeral 16 indicates each of a pair of plates which have portions 17 pivotally connected to the bracket 15. There is further provided a plate 16' which has a portion thereof engaging the bracket 15.

As shown in the drawings, spring members 18 are connected to the plates 16, and links 20 are fastened to the plate 16'. Body members 21 are connected to the springs 18, and a body member 21' is connected to the links 20. The numeral 22 indicates cross members which extend between the body members 21 and 21' and the chain 12 and the cross members are fastened in place so that they extend over the outer periphery of the tire 11.

A locking lever 23 is pivotally connected to the plate 16' as at 24 and the lever 23 carries an eye member 23' which is adapted to engage a hasp 25 that is mounted on plate 21' and a pin 26 is adapted to extend through the hasp 25. A suitable cotter key is adapted to be arranged through a suitable opening in the pin 26 so as to maintain the parts locked in their desired position. The plate 16' and locking lever 23 are so constructed that they can be disconnected from the bracket 15, as for example, when the unit anti-skid device is being removed or placed on the wheel 10.

From the foregoing, it is apparent that there has been provided a unit anti-skid device which is in the nature of a unit assembly that can be conveniently mounted on a vehicle wheel such as the wheel 10, as for example when the vehicle is traveling in adverse conditions as for example when the vehicle is being operated in snowy or icy road areas or surfaces. With the present invention it is not necessary to jack up the vehicle or remove the wheel to mount the assembly on the wheel since it is only necessary to arrange the unit assembly as shown in Figures 1 and 2 for example and this can be accomplished without the necessity of jacking up the vehicle. When the assembly is not needed it can be conveniently removed without much trouble by removing the pin 26 from the hasp 25 and then pivoting the lever 23 downwardly from the position shown in Figure 1 or downwardly from the position shown in Figure 3. This will permit the lever 23 and plate 16' to be disconnected from the bracket 15, so that the cross members 22 can be readily removed from the wheel 10 and tire 11. At the same time, the hook member 14 can be disengaged or disconnected from the chain 12 so that the entire assembly can be readily removed from the axle of the wheel and then placed in a convenient location such as in the trunk of the vehicle or the like. When the assembly is being arranged around the axle and positioned on the wheel the reverse procedure is followed.

The parts can be made of any suitable material and in different shapes or sizes.

The present invention is easy to remove or apply and the difference between the tire wear and the tension necessary to hold the device in place is taken up by the springs 18. Furthermore, there will be no accidental uncoupling when in use. As shown in Figure 2, the chain 12 assumes a substantially triangular shape when under proper tension, and the members 22 are attached or arranged in groups of three each to insure an even pull across the top of the tire. The unit device will fit wheels of different sizes and it is not necessary to jack up the vehicle in order to install the unit device when needed. Furthermore, the unit device can be quickly and easily removed or mounted on the vehicle wheel and the unit device can be used when driving in snow, ice, mud or the like. The entire unit assembly comes in one package so that there are no loose parts to become separated or lost and since the unit device can be readily removed or installed, there will be less of a tendency for people to ride with the unit device on over cleared sections of highway where the greatest wear and injury occurs so that the unit chain assembly of the present invention will last longer than other types of similar devices.

Minor changes in shape, size and rearrangement of details coming within the field of invention claimed may be resorted to in actual practice, if desired.

I claim:

1. In a unit device of the character described, a chain arranged contiguous to one side of a vehicle wheel and including a plurality of links connected together, a hook member detachably connecting certain of said links together, a hexagonal shaped bracket contiguous to the other side of the wheel, a plurality of plates connected to said bracket with one of said plates being adjustably connected to said bracket, springs connected to certain of said plates and links connected to certain of said plates, body members connected to said springs and links, and cross members extending between said body members and chain.

2. In a unit device of the character described, a chain arranged contiguous to one side of a vehicle wheel and including a plurality of links connected together, a hook member detachably connecting certain of said links together, a hexagonal shaped bracket contiguous to the other side of the wheel, a plurality of plates connected to said bracket with one of said plates being adjustably connected to said bracket, springs connected to certain of said plates and links connected to certain of said plates, body members connected to said springs and links, cross members extending between said body members and chain, a locking lever connected to one of said plates, and a hasp and pin for maintaining the lever in locked position.

3. In a unit device of the character described, a wheel provided with a tire, a chain arranged on one side of the wheel, a bracket arranged on the other side of the wheel, and cross members extending across the outer periphery of the tire and certain of said cross members are operably connected to said bracket and chain by a manually operated lock lever, and springs connecting certain of said cross members to said bracket, said manually operated lock lever being adapted to tension the springs connected to said bracket and to certain of said cross members to position and to hold the unit device in operable position on the wheel, a plate on which said manually operated lock lever is pivotally mounted connected to said first mentioned cross members and means on said plate for releasably connecting said manually operable lock lever to said bracket.

References Cited in the file of this patent
UNITED STATES PATENTS

| | | |
|---|---|---|
| 1,494,289 | Round | May 13, 1924 |
| 1,439,553 | Johnston | Dec. 19, 1927 |
| 2,735,472 | Beery | Feb. 21, 1956 |